(12) United States Patent
Chui et al.

(10) Patent No.: US 12,141,249 B2
(45) Date of Patent: Nov. 12, 2024

(54) SECURELY STORING DIGITAL CONTENT USING A DISTRIBUTED LEDGER

(71) Applicant: International Business Machines Corporation, Armonk, NY (US)

(72) Inventors: Hin Ting Chui, Ontario (CA); Jarett D. Stein, Bryn Mawr, PA (US); Bradley C. Herrin, Apex, NC (US); Xianjun Zhu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 16/191,684

(22) Filed: Nov. 15, 2018

(65) Prior Publication Data

US 2020/0159890 A1 May 21, 2020

(51) Int. Cl.
*G06F 21/00* (2013.01)
*G06F 16/18* (2019.01)
(Continued)

(52) U.S. Cl.
CPC .......... *G06F 21/16* (2013.01); *G06F 16/1805* (2019.01); *G06F 16/907* (2019.01);
(Continued)

(58) Field of Classification Search
CPC .... G06F 21/16; G06F 16/907; G06F 16/1805; G06F 21/128; G06F 21/105; G06F 21/6218; G06F 16/25; H04L 9/0643; H04L 9/3234; H04L 2209/608; H04L 2209/38; H04L 2209/603; H04L 9/3239
See application file for complete search history.

(56) References Cited

U.S. PATENT DOCUMENTS 9,679,276 B1 6/2017 Cuende
9,965,628 B2 5/2018 Ford et al.
(Continued)

FOREIGN PATENT DOCUMENTS

AU 2018100503 A4 6/2018
CN 106682457 A 5/2017
(Continued)

OTHER PUBLICATIONS

IBM, "List of IBM Patents or Patent Applications Treated as Related", Appendix P. 2 pages, dated Nov. 16, 2018.
(Continued)

*Primary Examiner* — Kevin Ayala
(74) *Attorney, Agent, or Firm* — Scott S. Dobson (57) ABSTRACT

Software for securely storing digital content using a distributed ledger. The software performs the following operations: (i) receiving identification information of an owner of a digital asset, metadata of the digital asset, a digital hash of the digital asset, and the digital asset; (ii) verifying authenticity of the owner based, at least in part, the received identification information; (iii) in response to verifying the authenticity of the owner, creating a watermarked version of the digital asset based on the identification information of the owner, the metadata of the digital asset, and the digital hash; and (iv) storing the digital asset and the watermarked version of the digital asset in a first distributed ledger.

20 Claims, 6 Drawing Sheets

(51) Int. Cl.
*G06F 16/907* (2019.01)
*G06F 21/10* (2013.01)
*G06F 21/12* (2013.01)
*G06F 21/16* (2013.01)
*H04L 9/06* (2006.01)
*H04L 9/32* (2006.01)
*H04L 9/00* (2022.01)

(52) U.S. Cl.
CPC .......... *G06F 21/105* (2013.01); *G06F 21/128* (2013.01); *H04L 9/0643* (2013.01); *H04L 9/3234* (2013.01); *H04L 9/50* (2022.05); *H04L 2209/603* (2013.01); *H04L 2209/608* (2013.01)

(56) References Cited

U.S. PATENT DOCUMENTS

| | | | |
|---|---|---|---|
| 2015/0245084 A1* | 8/2015 | Downing | H04N 21/44222 725/12 |
| 2016/0292680 A1 | 10/2016 | Wilson, Jr. et al. | |
| 2016/0300234 A1 | 10/2016 | Moss-Pultz et al. | |
| 2016/0321769 A1* | 11/2016 | McCoy | G06Q 30/0185 |
| 2017/0111175 A1 | 4/2017 | Oberhauser et al. | |
| 2017/0116693 A1 | 4/2017 | Rae et al. | |
| 2017/0206523 A1 | 7/2017 | Goeringer et al. | |
| 2017/0236094 A1 | 8/2017 | Shah | |
| 2018/0181909 A1 | 6/2018 | Wilkinson | |
| 2018/0219685 A1 | 8/2018 | Deery et al. | |
| 2018/0288022 A1* | 10/2018 | Madisetti | G06Q 20/3829 |
| 2018/0322259 A1* | 11/2018 | Solow | G06F 21/645 |
| 2018/0351830 A1 | 12/2018 | Kenna, III | |
| 2018/0352268 A1 | 12/2018 | O'Hanlon | |
| 2018/0375869 A1* | 12/2018 | Qiu | H04L 9/06 |
| 2019/0155997 A1* | 5/2019 | Vos | H04L 9/0637 |
| 2019/0207995 A1 | 7/2019 | Gonzales, Jr. | |
| 2019/0236285 A1 | 8/2019 | Cantrell | |
| 2019/0238316 A1 | 8/2019 | Padmanabhan | |
| 2019/0266312 A1 | 8/2019 | Mintz | |
| 2019/0294761 A1* | 9/2019 | Kim | H04L 9/0825 |
| 2019/0311148 A1 | 10/2019 | Andrade | |
| 2019/0373339 A1* | 12/2019 | Bradley | H04N 21/2543 |
| 2020/0012765 A1* | 1/2020 | Smaiely | G06Q 20/1235 |
| 2020/0295949 A1* | 9/2020 | Ding | H04L 9/3239 |
| 2021/0091924 A1* | 3/2021 | Holmberg | G06Q 20/02 |

FOREIGN PATENT DOCUMENTS

| | | |
|---|---|---|
| CN | 111191271 A | 5/2020 |
| WO | 2018032890 A1 | 2/2018 |
| WO | 20180328901 A1 | 2/2018 |

OTHER PUBLICATIONS

"Ecosystem for Visual Digital Assets on Blockchain", a.k.a. Tokenize Visual Content Copyrights Management, IPStock White Paper, rev.2 | Feb. 28, 2018, pp. 1-27.

Ramachandran et al., "SmartProvenance: A Distributed, Blockchain Based DataProvenance System", Proceedings of the Eighth ACM Conference on Data and Application Security and Privacy, CODASPY'18, Mar. 19-21, 2018, Tempe, AZ, USA, pp. 35-42.

Ramachandran et al., "Using Blockchain and smart contracts for secure data provenance management", arXiv:1709.10000v1 [cs.CR] Sep. 28, 2017, pp. 1-11.

Xu et al., "Design of Network Media's Digital Rights Management Scheme Based on Blockchain Technology", 2017 IEEE 13th International Symposium on Autonomous Decentralized System (ISADS), pp. 128-133.

Chui et al., "Preventing Fraud in Digital Content Licensing and Distribution Using Distributed Ledgers", U.S. Appl. No. 16/191,657, filed Nov. 15, 2018, 34 pages.

* cited by examiner

SECURELY STORING DIGITAL CONTENT USING A DISTRIBUTED LEDGER

BACKGROUND

The present invention relates generally to the field of blockchain systems, and more particularly to blockchain systems for enforcement of digital licenses and content distribution.

Blockchain refers to a distributed, permissioned, and immutable ledger capable of recording transactions. Blockchain is a decentralized technology comprising a peer-to-peer (P2P) network comprising computers, referred to as nodes. Blockchain further includes methods for the nodes to validate transactions. Once a transaction is validated by the nodes, a new block is added to the existing blockchain containing information to confirm the transaction.

SUMMARY

According to an aspect of the present invention, there is a method, computer program product, and/or computer system that performs the following operations (not necessarily in the following order): (i) receiving identification information of an owner of a digital asset, metadata of the digital asset, a digital hash of the digital asset, and the digital asset; (ii) verifying authenticity of the owner based, at least in part, the received identification information; (iii) in response to verifying the authenticity of the owner, creating a watermarked version of the digital asset based on the identification information of the owner, the metadata of the digital asset, and the digital hash; and (iv) storing the digital asset and the watermarked version of the digital asset in a first distributed ledger.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Digital rights management (DRM) refers to technologies useful for restricting the use of copyrighted materials (e.g., audio-visual materials). Typically, a DRM software will provide access control for use, modification, and/or distribution of a managed material. However, DRM typically operates in a centralized manner and makes it difficult to monitor actual use of the materials. To address this and other shortcomings, a blockchain digital licensing system is disclosed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
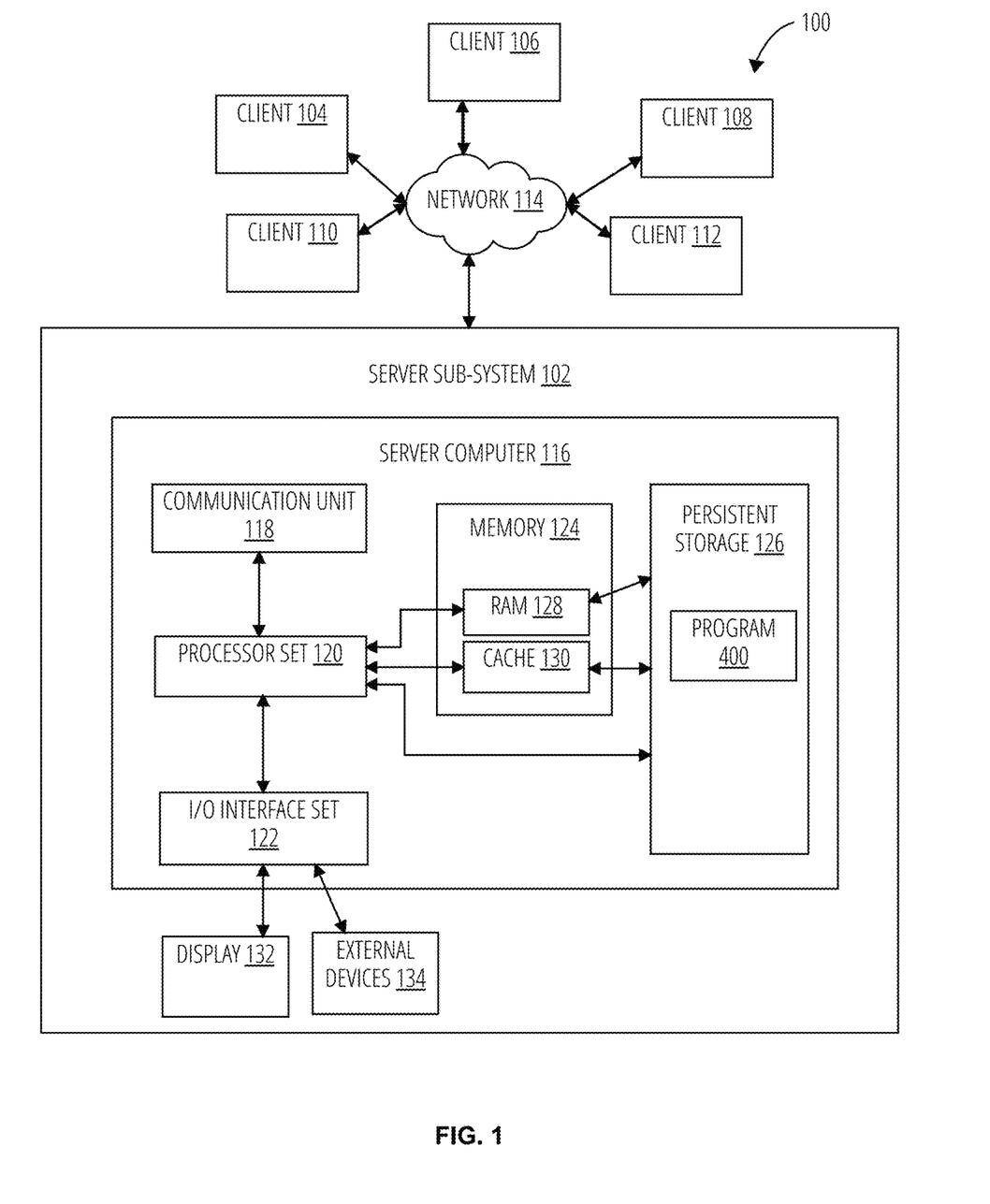
FIG. 1 is a block diagram depicting networked computers system 100, according to an embodiment of the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-system 104; client sub-system 106; client sub-system 108, client sub-system 110, client sub-system 112; communication network 114; server computer 116; communication unit 118; processor set 120; input/output (I/O) interface set 122; memory device 124; persistent storage device 126; display device 132; external device set 134; random access memory (RAM) devices 128; cache memory device 130; and program 400.

Sub-system 102, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 400 is a collection of machine readable instructions and/or data that is used to create, manage and control certain software functions that will be discussed in detail, below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 124 and persistent storage device 126 are computer-readable storage media. In general, memory device 124 can include any suitable volatile or non-volatile computer-readable storage media. It is further noted that, now and/or in the near future: (i) external device set 134 may be able to supply, some or all, memory for sub-system 102; and/or (ii) devices external to sub-system 102 may be able to provide memory for sub-system 102.

Figure 4:
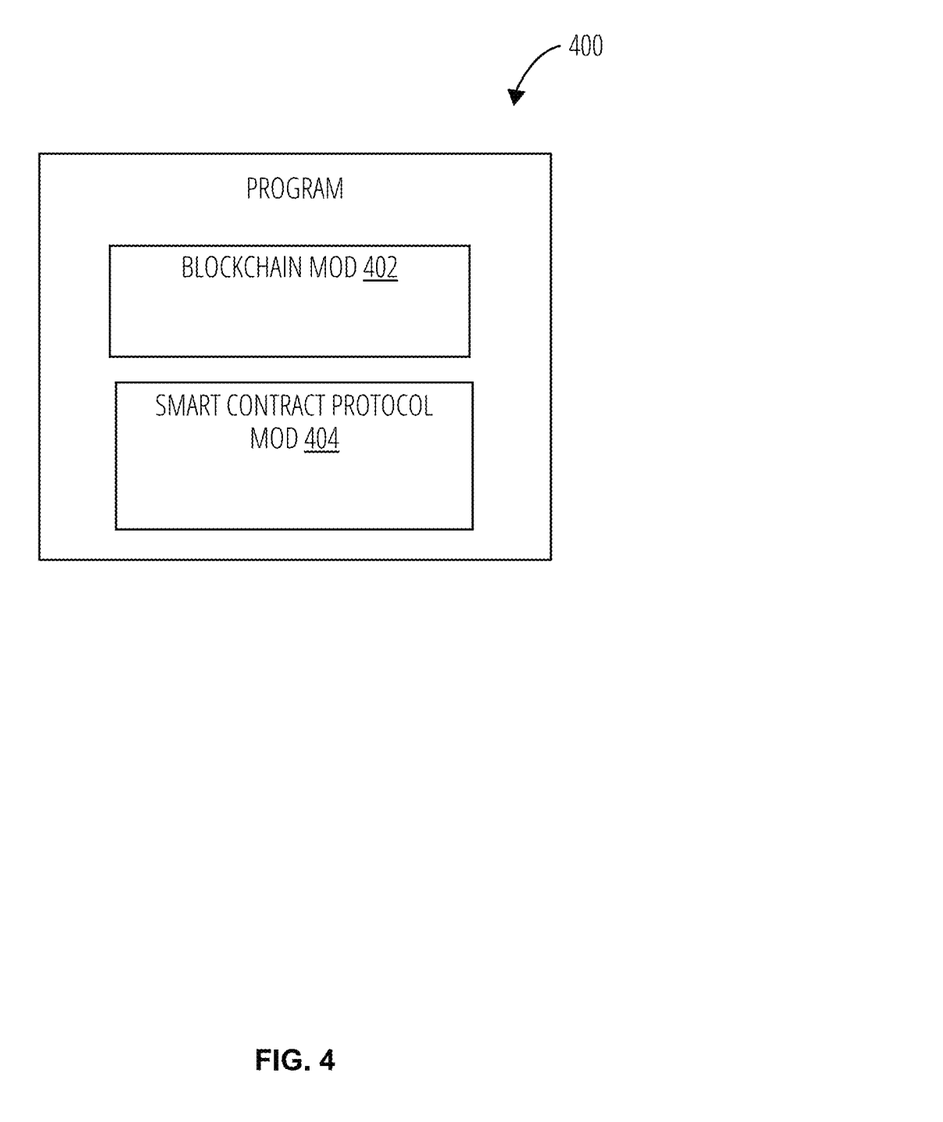
FIG. 4 is a block diagram depicting program 400, according to an embodiment of the present invention.

Program 400 may include a distributed, permissioned, and immutable ledger such as blockchain. In some embodiments, the blockchain consists of multiple nodes that communicate with each other. In some embodiments, the blockchain may include nodes of three types: (i) client nodes that submit transaction-invocations, (ii) peer nodes that commit transactions and maintain the state and a copy of the ledger, and (iii) orderer nodes that implement communication services with delivery guarantees, such as atomic or total order broadcast.

Program 400 may also include one or more consensus mechanisms for validating transactions before they are permanently stored on a block of the blockchain. In some embodiments of the present invention, consensus is the verification of the correctness of one or more transactions comprising a block. Consensus may be achieved when the order and results of one or more transactions in a block have met the explicit policy criteria checks. Consensus methods may include endorsement policies to dictate which specific members of a permissioned blockchain network must endorse a certain transaction class. Consensus methods may further employ chaincode (e.g., a prescribed interface for a business logic agreed to by members of the permissioned blockchain) to ensure that the endorsement policies are enforced by, for example, verifying that enough endorsements are present and/or verifying that the endorsements derived from the appropriate members of the permissioned blockchain network. After verifying the appropriate endorsements are present, a versioning check may include an agreement or consent of the current state of the ledger before any blocks containing transactions are appended to the ledger.

Program 400 may also include programs called chaincode, hold state and ledger data, and execute transactions. Program 400 chaincode may be used for executing smart contracts (e.g., automatically executing transactions and recording information onto the ledger) based on events occurring on the blockchain. Smart contracts may also include mutually-agreed conditions by members of a permissioned blockchain network for transactions to take place. The chaincode may be the central element of the blockchain as transactions are operations invoked on the chaincode. In some embodiments, transactions may have to be "endorsed" and only endorsed transactions may be committed and have an effect on the state. In some embodiments, the blockchain may include one or more special chaincodes for management functions and parameters, collectively called system chaincodes. In an exemplary embodiment, program 400 may be implemented in a framework such as Hyperledger Fabric. (Note: the term(s) "HYPERLEDGER" and/or "HYPERLEDGER FABRIC" may be subject to trademark rights in various jurisdictions throughout the world and are used here only in reference to the products or services properly denominated by the marks to the extent that such trademark rights may exist.)

Program 400 is stored in persistent storage device 126 for access and/or execution by one or more of the respective computer processors of processor set 120, usually through one or more memories of memory device 124. Persistent storage device 126: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 126. Program 400 may also be stored and accessed from a public or private cloud service (e.g., blockchain-as-a-service). Program 400 may include both machine readable and performable instructions and/or substantive data (that is, the type of data stored in a database). In this particular embodiment, persistent storage device 126 includes a magnetic hard disk drive. To name some possible variations, persistent storage device 126 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 126 may also be removable. For example, a removable hard drive may be used for persistent storage device 126. Other examples include optical and magnetic disks, thumb drives, and smart cards that are inserted into a drive for transfer onto another computer-readable storage medium that is also part of persistent storage device 126.

Communication unit 118, in these examples, provides for communications with other data processing systems or devices external to sub-system 102. In these examples, communication unit 118 includes one or more network interface cards. Communication unit 118 may provide communications through the use of either or both physical and wireless communications links. Any software modules discussed herein may be downloaded to a persistent storage device (such as persistent storage device 126) through a communications unit (such as communication unit 118).

I/O interface set 122 allows for input and output of data with other devices that may be connected locally in data communication with server computer 116. For example, I/O interface set 122 provides a connection to external device set 134. External device set 134 will typically include devices such as a keyboard, keypad, a touch screen, and/or some other suitable input device. External device set 134 can also include portable computer-readable storage media such as, for example, thumb drives, portable optical or magnetic disks, and memory cards. Software and data used to practice embodiments of the present invention, for example, program 400, can be stored on such portable computer-readable storage media. In these embodiments the relevant software may (or may not) be loaded, in whole or in part, onto persistent storage device 126 via I/O interface set 122. I/O interface set 122 also connects in data communication with display device 132.

Display device 132 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 2:
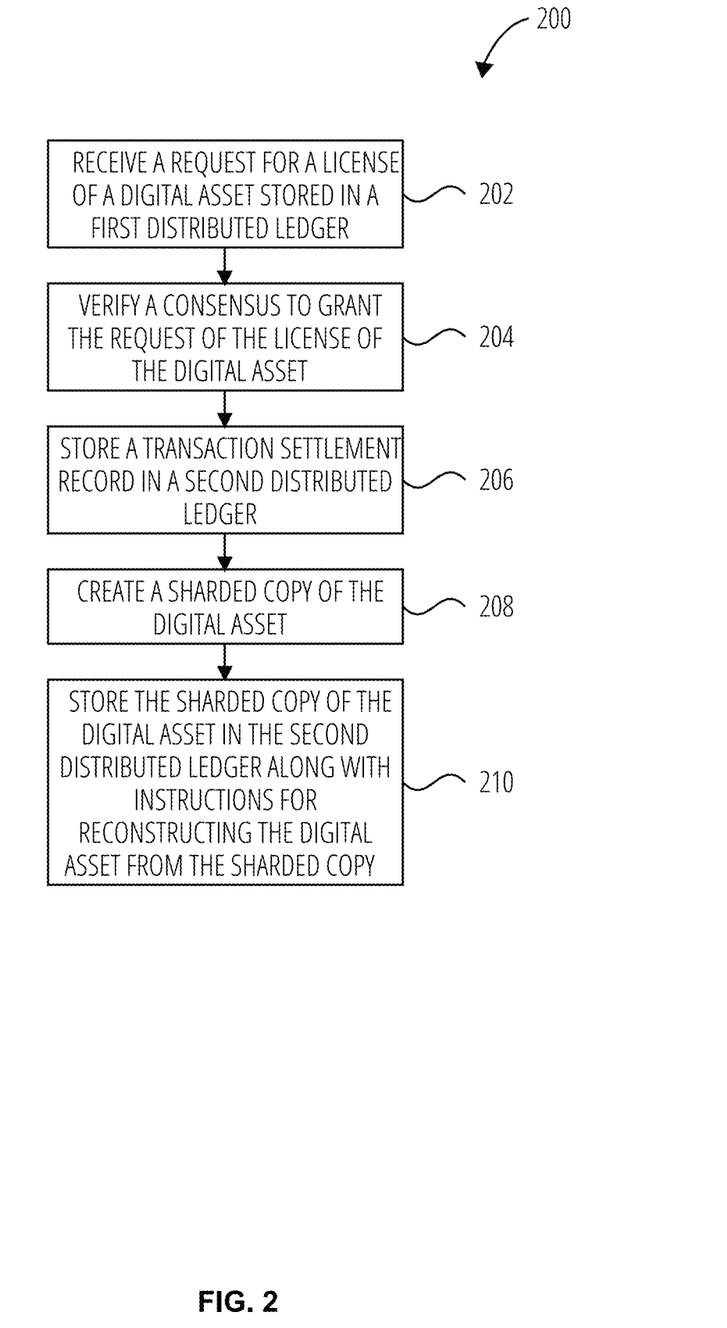
FIG. 2 shows flowchart 200 depicting a method to provide a license for a digital asset stored in a blockchain ledger, according to an embodiment of the present invention.
Figure 3:
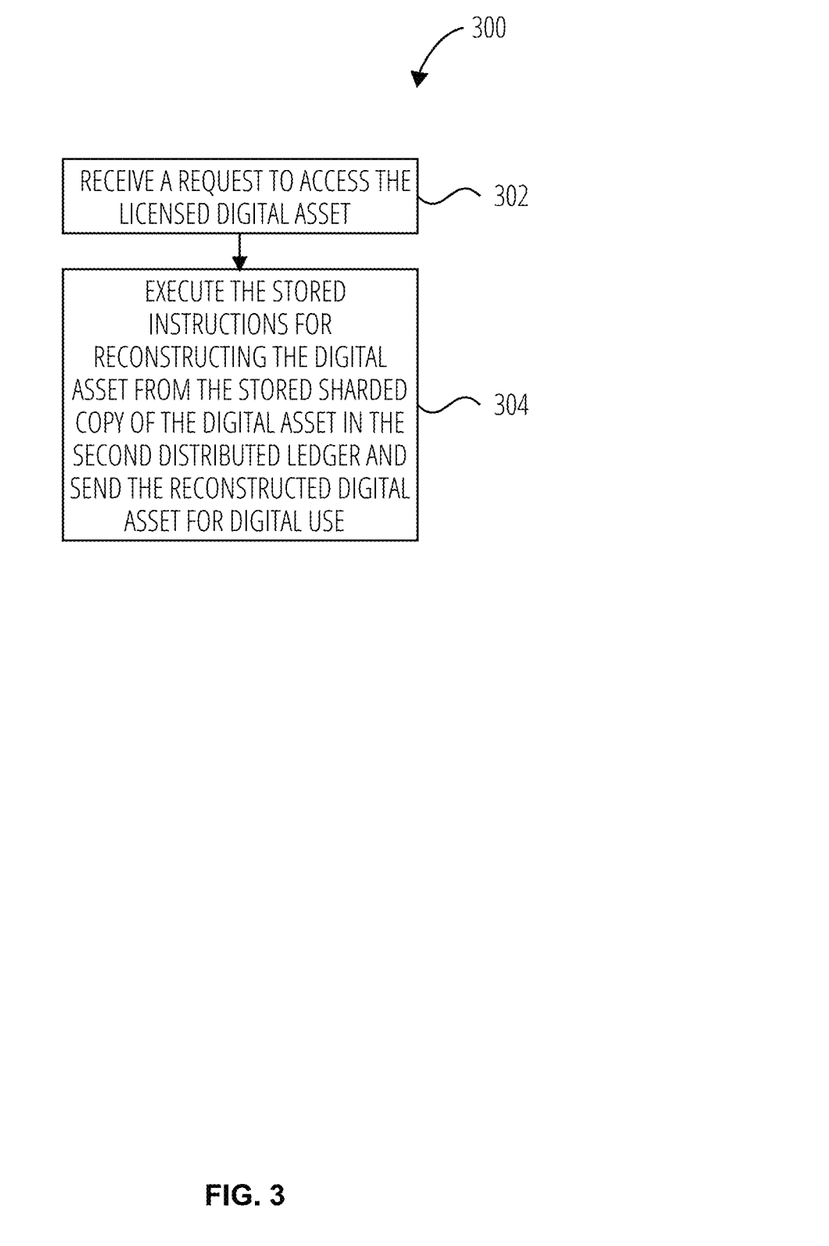
FIG. 3 shows flowchart 300 depicting a method to reconstruct a sharded digital asset stored in a blockchain ledger, according to an embodiment of the present invention.

FIG. 2 shows flowchart 200 depicting a method according to the present invention. FIG. 3 shows flowchart 300 depicting a method according to the present invention. FIG. 4 shows program 400 for performing at least some of the method operations of the flowchart 200 and flowchart 300. The methods of flowchart 200 and flowchart 300, and the associated software of program 400, will now be discussed over the course of the following paragraphs, with reference to FIG. 2 and FIG. 3 (for the method operation blocks) and FIG. 4 (for the software module ("mod") blocks).

Referring to flowchart 200 (see FIG. 2), processing begins at operation 202, where blockchain mod 402 (see FIG. 4) receives a request for a license of a digital asset. In some embodiments of the present invention, a record of the digital asset may be stored in a first distributed ledger. In some embodiments, the first distributed ledger is a blockchain. In some embodiments, a first permissioned blockchain network includes the owner of the digital asset and a second permissioned blockchain network includes a prospective licensee of the digital asset. In some embodiments, the second permissioned blockchain network initiates a request for the license of the digital asset. In some embodiments, the request for the license of the digital asset may include a consensus method (e.g., if the request is received from a permissioned blockchain network with multiple members).

In an exemplary embodiment, Sarah and Ben are the rightful owners of a photograph (i.e., the digital asset). Sarah and Ben form a permissioned blockchain network A. Sarah and Ben, as members of the permissioned blockchain network, initiate a vote (or an alternative consensus method) to store the photograph in a first distributed ledger for the purposes of offering licenses of the photograph. In response to validating consensus in permissioned blockchain network A to offer the photograph for licensing, the blockchain mod 402 stores the photograph in a first distributed ledger. In response to the photograph being added to the first distributed ledger, a watermarked version of the photograph is included in a public digital asset catalog. Some of these aspects of the invention are discussed in more detail, below, with respect to FIG. 5 and FIG. 6.

After inspecting the public catalog and finding the watermarked version of the photograph to their liking, Bob and Lisa, members of a permissioned blockchain network B, initiate a vote (or an alternative consensus method) to request a license of the photograph. In response to validating consensus in permissioned blockchain network B to request the license of the photograph, smart contract protocol mod 404 may initiate a request for a license of the photograph.

Processing continues at operation 204, where smart contract protocol mod 404 (see FIG. 3) verifies a consensus to grant the request of the license of the digital asset. In some embodiments of the present invention, consensus methods may include endorsement policies to dictate which specific members of a permissioned blockchain network must endorse a certain transaction class. Consensus methods may include determining that the endorsement policies are enforced by, for example, verifying that enough endorsements are present and/or verifying that the endorsements are derived from the appropriate members of the permissioned blockchain network. In some embodiments, the members of the first blockchain network, including the owner of the digital asset, are the appropriate members of the permissioned blockchain network to grant the request of the license of the digital asset.

In the exemplary embodiment, Sarah and Ben, members of network A, initiate a vote (or an alternative consensus method) to grant the request a license of the photograph. The smart contract protocol mod 404 may verify the transaction by determining that Sarah and Ben are, in fact, the required members of permissioned blockchain network A to approve the request of the license of the photograph. The smart contract protocol mod 404 may further verify the transaction using one or more other known consensus methods.

Processing proceeds to operation 206, where smart contract protocol mod 404 (see FIG. 4) stores a transaction settlement record in a second distributed ledger. In some embodiments of the present invention, the second distributed ledger is also a blockchain. In some embodiments, the second distributed ledger is created to store the transaction settlement record between the first permissioned blockchain network and the second permissioned blockchain network. In some embodiments, the second distributed ledger is shared between the first permissioned blockchain network and the second permissioned blockchain network. In some embodiments, the second distributed ledger is also employed to distribute the licensed digital asset and/or enforce the use of the licensed digital asset.

In the exemplary embodiment, smart contract protocol mod 404 creates a second distributed ledger and stores a transaction settlement record for the license of the photograph in the second distributed ledger. The transaction settlement record contains a summary of the transaction that prompted the creation of the second distributed ledger.

Processing continues at operation 208, where smart contract protocol mod 404 (see FIG. 4) creates a sharded copy of the digital asset including a plurality of shards of the digital asset. In some embodiments of the present invention, the smart contract protocol mod 404 uses a sharding algorithm (e.g., transaction sharding, network sharding, and/or state sharding) to uniquely tile and disassemble the digital asset. In some embodiments, the sharding algorithm is selected for efficient distribution of the digital asset and enforcement of the license of the digital asset. In an approach using network sharding, the digital asset is sharded into a plurality of shards corresponding to a plurality of nodes of the second distributed ledger. For example, each shard of the plurality of shards may be stored in a distinct node of the plurality of nodes (i.e., one shard per node in a one-to-one assignment). In this approach, reconstructing the digital asset may require accessing the plurality of nodes, where each node independently enforces the license of the digital asset (e.g., by implementation of a consensus method for valid use of the digital asset under the granted license). These aspects of the invention represent an improvement over existing technology by allowing license enforcement and content distribution in a decentralized manner.

In the exemplary embodiment, the smart contract protocol mod 404 creates a sharded copy of the photograph. The smart contract protocol mod 404 further implements a network sharding algorithm using a first node of the second distributed ledger and a second node of the second distributed ledger. In this example, the first node is associated with permissioned blockchain network A and the second node is associated with permissioned blockchain network B.

Processing proceeds to operation 210, where smart contract protocol mod 404 (see FIG. 3) stores the sharded copy of the digital asset in the second distributed ledger with instructions for reconstructing the digital asset from the sharded copy. In some embodiments of the present invention, the sharding algorithm determines which shards to store in a first node of the second distributed ledger and which shards to store in a second node of the second distributed ledger. In some embodiments, the first node is associated with the permissioned blockchain network A and the second node is associated with the permissioned blockchain network B. In some embodiments, the instructions for reconstructing the digital asset from the sharded copy include computer instructions for reassembly and distribution of the digital asset. In some embodiments, additional nodes may be used to store shards of the sharded copy of the digital asset. In these and other embodiments, the nodes may verify and enforce the access of the licensed digital asset.

In the exemplary embodiment, the smart contract protocol mod 404 stores a first shard of the sharded copy of the photograph in the first node and a second shard of the sharded copy of the photograph in the second node along with computer instructions to reassemble the digital asset from the first node and the second node.

Referring now to flowchart 300 (see FIG. 3), processing begins at operation 302, where smart contract protocol mod 404 (see FIG. 4) receives a request to access the licensed digital asset. In some embodiments of the present invention, the request for the licensed digital asset is received in response to a user requesting access to the licensed digital asset. In some embodiments, the smart contract protocol mod 404 may include a consensus method to enforce use of the digital asset. In some embodiments, the consensus method includes verifying the transaction to ensure that the intended use is supported by the license of the digital asset. In some embodiments, the consensus method to enforce use of the digital asset may include each node of a plurality of nodes (e.g., in a network sharding approach) independently enforcing the license of the digital asset.

In the exemplary embodiment, Bob and Lisa use the licensed photograph in a website. When a user opens the website, a request for the licensed digital asset is automatically generated. Upon receiving the request, smart contract protocol mod 404 verifies that the request is for a valid use of the photograph by, for example, verifying the request comes from an authorized user.

Processing continues at operation 304, where smart contract protocol mod 404 (see FIG. 4) executes the stored instructions for reconstructing the digital asset from the stored sharded copy of the digital asset in the second distributed ledger and sends the reconstructed digital asset for digital use. In some embodiments, reconstructing the digital asset may include reconstructing the digital asset from a plurality of shards stored in a plurality of nodes of the second distributed ledger (e.g., in a network sharding approach). For example, each shard of the plurality of shards may be retrieved from a distinct node of the plurality of nodes (i.e., one shard per node in a one-to-one assignment).

In the exemplary embodiment, smart contract protocol mod 404 reassembles the digital asset from the first distributed ledger and the second distributed ledger by retrieving the first shard of the sharded copy of the photograph from the first distributed ledger and the second shard of the sharded copy of the photograph from the second distributed ledger. Smart contract protocol mod 404 reassembles the licensed digital asset for use in the website as authorized by the terms of the license obtained by Bob and Lisa and sends the reconstructed photograph for use in the website.

Figure 5:
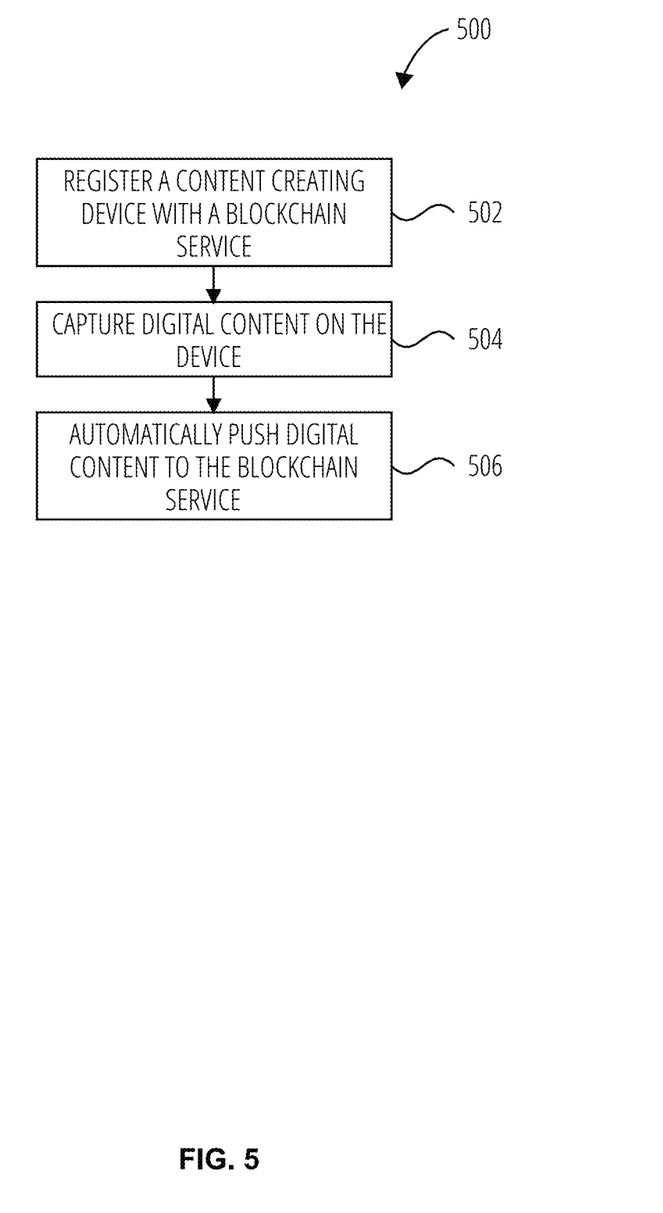
FIG. 5 shows flowchart 500 depicting a method to capture digital content and push it to a blockchain service, according to an embodiment of the present invention.
Figure 6:
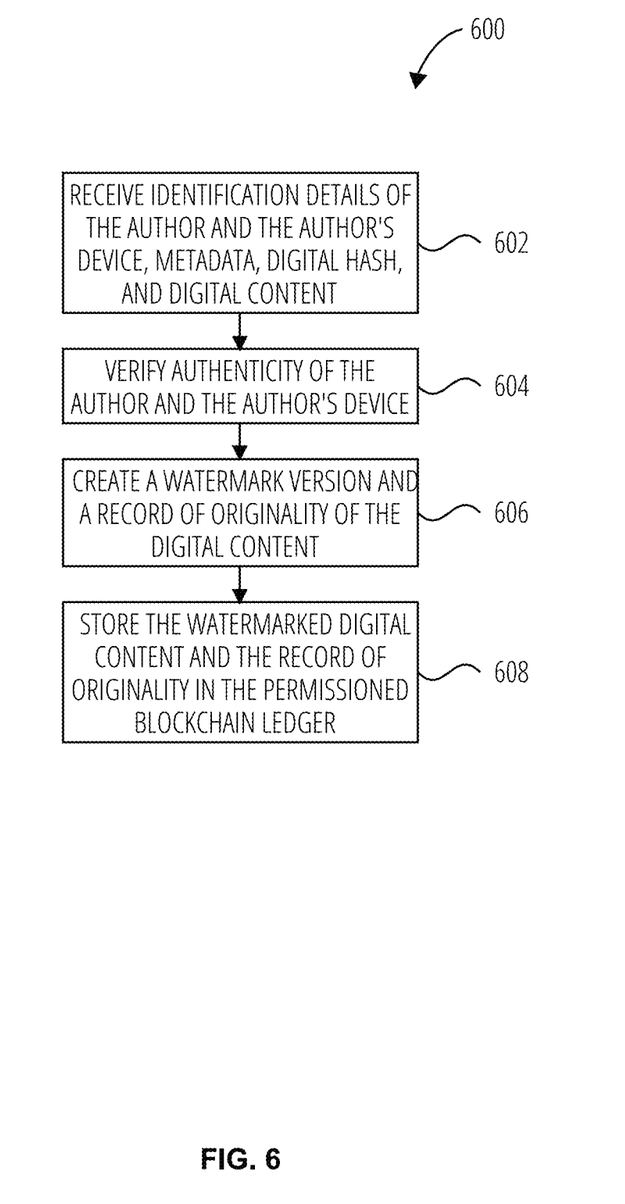
FIG. 6 shows flowchart 600 depicting a method to store a digital asset in a blockchain ledger, according to an embodiment of the present invention.

In some embodiments of the present invention, a workflow is provided for storing digital content itself (e.g., in a watermarked format) on a permissioned blockchain ledger. FIG. 5 and FIG. 6 show flowchart 500 and flowchart 600, respectively, depicting methods according to one of these embodiments.

Referring first to flowchart 500 (see FIG. 5), in operation 502, a content author uses a content creating device (e.g., a smartphone or an Internet-enabled camera, such as client sub-system 104) to register the content creating device with a blockchain service. For example, the author uses the device to establish an ownership identity that includes authentication details of the author (e.g., a fingerprint) and authentication details of the device (e.g., a serial number), and then the device provides the ownership identity to a blockchain service (e.g., via blockchain mod 402). At operation 504, the author uses the device to capture digital content (e.g., photographs, drawings, sound recordings, etc.) on the device. Then, at operation 506, the device, in response to the author capturing the digital content, automatically pushes the digital content to the blockchain service by sending the digital content to blockchain mod 402. In this embodiment, when pushing the digital content to the blockchain service, the device also sends to blockchain mod 402 the identification details of the author, the identification details of the device, metadata (e.g., time, location, device make, device model, etc.) of the digital content, and a digital hash of the digital content.

Referring now to flowchart 600 (see FIG. 6), in operation 602, blockchain mod 402 receives, from the author's device, the identification details of the author, the identification details of the author's device, the metadata of the digital content, the digital hash of the digital content, and the digital content. Processing proceeds to operation 604, where blockchain mod 402 then uses the identification details of the author and the authentication details of the author's device to verify authenticity of the author and the author's device. For example, in some embodiments, blockchain mod 402 compares the identification details of the author and the identification details of the author's device with registration information stored by the blockchain service (e.g. from the registration of operation 502, discussed above).

Processing then proceeds to operation 606 where, upon approval of authenticity, smart contract protocol mod 404 uses the received metadata to create a unique watermark on the digital content and a record of originality of the digital content. In some embodiments, the watermark is created based on the identification information of the owner, the metadata of the digital asset, and the digital hash. Many known (or to be known) watermarking techniques may be used, including techniques for watermarks that are visible to human users as well as techniques for digital watermarks that are only detectable by computers. Similarly, many known (or to be known) techniques for providing digital records of originality and/or authenticity may be used; in fact, in some cases the watermark itself serves as the record of originality.

Processing then proceeds to operation 608, where blockchain mod 402 stores the watermarked digital content and the record of originality in a permissioned blockchain ledger. Many known (or to be known) methods for storing items in blockchain ledgers may be used, including methods discussed elsewhere in this Detailed Description with respect to other embodiments. Furthermore, in some embodiments, the watermarked digital content is stored in the blockchain ledger along with the original digital content, either in the same node or in adjacent nodes. In still other embodiments, the watermarked digital content is stored on a node in a first distributed ledger with a link to a node in a second distributed ledger where the original digital content is stored, where the link is stored in either the same node or an adjacent node to the watermarked digital content.

In some embodiments of the present invention, the blockchain service includes a smart contract protocol and blockchain architectures to allow cross-network licensing of digital content and preserve links between networks. In some embodiments, the blockchain service provides the advantage of properly licensing content between multiple permissioned blockchain networks through a smart contract protocol. In some embodiments, the smart contract protocol allows granting licenses to the digital content while preserving the originality of the digital content across multiple permissioned blockchain networks.

In some embodiments of the present invention, a centralized or decentralized exchange exists for a permissioned blockchain network to grant watermark-protected views of digital content to licensed users. In some embodiments, the digital content is archived and catalogued for licensing. In some embodiments, users may submit requests for licensing of digital content for their use or on behalf of another blockchain network.

In some embodiments of the present invention, the smart contract protocol handles the digital signature of the original author and receives the licensed user fingerprint signature to prepare for record linking in an intermediary child ledger. In some embodiments, the intermediary child ledger is a blockchain ledger. In some embodiments, a network voting protocol may be used to receive the fingerprint signature for multi-member permissioned blockchain networks.

In an exemplary embodiment of the present invention, two permissioned blockchain networks (e.g., network A and network B) are interested in digital content. In this exemplary embodiment, network A is the owner of the original digital content and network B seeks to license the original digital content for its use. In this exemplary embodiment, network A and network B have unique governors and members with their own smart contracts and voting consensus.

In this exemplary embodiment, the master ledger of network A contains a digital content including a watermarked version of the digital content and the record of originality of the digital content. Network A may also place the watermarked image in a digital content catalog as a representation of the digital content and publish the digital content catalog for licensing. Network B may place a request for license the digital content to the members of network B. Upon approval of the request for license from network B, network A creates a child ledger, shared by both networks, where the child ledger tracks the beginning of the transaction history between the two permissioned blockchain networks. Network A gathers metadata signatures, member data, and protocols from network B and stores it in the child ledger. The blocks in the shared child ledger contain the linking between the transaction settlement records in both networks. The smart contract protocol centralizes a vote between permissioned blockchain networks for consensus of all members and signatures of liability and usage of the digital content.

In this exemplary embodiment, once consensus is reached, the smart contract uses a sharding algorithm to uniquely tile and disassemble the digital content before distributing it to network B. The smart contract may then store the sharded digital content in a block of the shared child ledger to provide access to network B. Upon settlement, the respective master ledgers of network A and network B may include the transaction with a cryptographic link to the shared child ledger. Network B does not receive access to the original digital content directly but rather may merely access the sharded digital content stored in the child ledger. The shared child ledger may also include the sharding algorithm (e.g., as part of a smart contract protocol) used by network B to reassemble and consume the digital content (e.g., displaying a picture on a web page or playing audio in an audio player). The master ledger of network A may also include a historical record of the licensing transaction by storing the metadata of the consumers and signatures of the members of network B.

Network A, as representative of the owner of the digital content, may be exclusively responsible for writing in the child ledger. Network A may also retain all administrative abilities of the shared child ledger as the starter and governor of the transaction. Network A may reserve the rights to revoke the sharding algorithm that assembles the digital content. For this reason, network B may be a read-only user of the shared child ledger.

The master ledger of network A may include the encrypted original copy of the digital content. For example, a private catalog where allowed members can access the digital content while being unable to copy or move the digital content without executing a smart contract. In other words, entering into a license agreement provides access to a decryption key where a private child ledger is created. This provides the licensed user a newly sharded watermarked copy of the original digital content including the fingerprint and the record of originality of the digital content. A sharding algorithm can reassemble the digital content based on the use authorized in the license agreement.

Once the encrypted version of the original image is entered into the block on the master ledger, the smart contract breaks the image into many encrypted tiles (i.e., sharding) on a shared child ledger block between the original author and the licensed user effectively obfuscating the image into tiles using a randomizing algorithm in the smart contract protocol. Creation of the shared child ledger may be shown as a transaction on the master ledger of the original author. The shared child ledger becomes a peer-to-peer (P2P) exchange between the original author and the member of the network in which a transfer of funds results in the generated code and encrypted tiles (i.e., the sharded digital content) to securely embed the image on their website under the copyright license agreement. Sharding the original digital content may be part of the smart contract protocol implemented using the private key of the original author, upon agreement, to decrypt (i.e., reassemble) the original digital content for the smart contract to obfuscate for licensing. In some embodiments, the blockchain service may also leverage existing digital rights management (DRM) technologies for digital media.

Once the transaction completes the agreement is stored along with the randomized tiles and their assembly algorithm and key signatures on network A master ledger and the shared child ledger maintaining a link to the original art owner master ledger node. Network B (the licensed user) may have a read-only link to the shared child ledger where the shared child ledger contains the obfuscated version of the digital content, an assembly algorithm, and embedding code the licensed user may execute to display, or otherwise access, the licensed digital content. This keeps the transactions completely private from the public world while also given full control and ownership exclusively to network A. As such, network A may remove the shared child ledger node from the network (e.g., if fraud, unauthorized use, or breach of contract is determined).

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine-readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    receiving, by one or more processors, a digital asset and identification information of an owner of the digital asset;
    creating, by one or more processors, a watermarked version of the digital asset based, at least in part, on metadata of the digital asset and on the received identification information;
    storing, by one or more processors, the digital asset in a node of a first blockchain, the first blockchain associated with a first permissioned blockchain network; and
    storing, by one or more processors, the watermarked version of the digital asset in a node of a second blockchain with a link to the node of the first blockchain, the second blockchain associated with the first permissioned blockchain network and a second permissioned blockchain network different from the first permissioned blockchain network, wherein:
        members of the first permissioned blockchain network are permissioned to access the digital asset in the node of the first blockchain based on their membership in the first permissioned blockchain network, and
        the members of the first permissioned blockchain network and members of the second permissioned blockchain network are permissioned to access the watermarked version of the digital asset in the node of the second blockchain based on their membership in the first permissioned blockchain network and the second permissioned blockchain network, respectively.

2. The computer-implemented method of claim 1, further comprising, providing, by one or more processors, a public digital asset catalog, wherein the public digital asset catalog allows users to request licenses for digital assets, including the digital asset, and verifies license requests using at least the first permissioned blockchain network.

3. The computer-implemented method of claim 2, further comprising, utilizing, by one or more processors, the watermarked version of the digital asset stored in the node of the second blockchain as a representation of the digital asset in the public digital asset catalog.

4. The computer-implemented method of claim 3, further comprising, in response to a user requesting a license of the digital asset via the public digital asset catalog:
    verifying, by one or more processors, a consensus for the request of the license of the digital asset using at least the first permissioned blockchain network and
    responsive to verifying the consensus for the request of the license of the digital asset, providing access to the digital asset to the user.

5. The computer-implemented method of claim 4, wherein providing access to the digital asset to the user includes providing a read-only link to the node on the first blockchain where the digital asset is stored.

6. The computer-implemented method of claim 4, wherein providing access to the digital asset to the user includes providing code for securely embedding the digital asset within a website.

7. The computer-implemented method of claim 1, wherein the digital asset is received from a device of an owner of the digital asset in response to the owner capturing the digital asset using the device.

8. A computer program product comprising a computer readable storage medium having stored thereon:
    program instructions to receive a digital asset;
    program instructions to create a watermarked version of the digital asset based, at least in part, on metadata of the digital asset;
    program instructions to store the digital asset in a node of a first blockchain, the first blockchain associated with a first permissioned blockchain network; and
    program instructions to store the watermarked version of the digital asset in a node of a second blockchain with a link to the node of the first blockchain, the second blockchain associated with the first permissioned blockchain network and a second permissioned blockchain network different from the first permissioned blockchain network, wherein:
        members of the first permissioned blockchain network are permissioned to access the digital asset in the node of the first blockchain based on their membership in the first permissioned blockchain network, and
        the members of the first permissioned blockchain network and members of the second permissioned blockchain network are permissioned to access the watermarked version of the digital asset in the node of the second blockchain based on their membership in the first permissioned blockchain network and the second permissioned blockchain network, respectively.

9. The computer program product of claim 8, the computer readable storage medium further having stored thereon program instructions to provide a public digital asset catalog, wherein the public digital asset catalog allows users to request licenses for digital assets, including the digital asset, and verifies license requests using at least the first permissioned blockchain network.

10. The computer program product of claim 9, the computer readable storage medium further having stored thereon program instructions to utilize the watermarked version of the digital asset stored in the node of the second blockchain as a representation of the digital asset in the public digital asset catalog.

11. The computer program product of claim 10, the computer readable storage medium further having stored thereon program instructions to, in response to a user requesting a license of the digital asset via the public digital asset catalog:

verify a consensus for the request of the license of the digital asset using at least the first permissioned blockchain network; and responsive to verifying the consensus for the request of the license of the digital asset, provide access to the digital asset to the user.

12. The computer program product of claim 11, wherein providing access to the digital asset to the user includes providing a read-only link to the node on the first blockchain where the digital asset is stored.

13. The computer program product of claim 11, wherein providing access to the digital asset to the user includes providing code for securely embedding the digital asset within a website.

14. The computer program product of claim 8, wherein the digital asset is received from a device of an owner of the digital asset in response to the owner capturing the digital asset using the device.

15. A computer system comprising:
a processor(s) set; and
a computer readable storage medium;
wherein:
the processor set is structured, located, connected and/or programmed to run program instructions stored on the computer readable storage medium; and
the stored program instructions include:
program instructions to receive a digital asset;
program instructions to create a watermarked version of the digital asset based, at least in part, on metadata of the digital asset;
program instructions to store the digital asset in a node of a first blockchain, the first blockchain associated with a first permissioned blockchain network; and
program instructions to store the watermarked version of the digital asset in a node of a second blockchain with a link to the node of the first blockchain, the second blockchain associated with the first permissioned blockchain network and a second permissioned blockchain network different from the first permissioned blockchain network, wherein:

members of the first permissioned blockchain network are permissioned to access the digital asset in the node of the first blockchain based on their membership in the first permissioned blockchain network, and the members of the first permissioned blockchain network and members of the second permissioned blockchain network are permissioned to access the watermarked version of the digital asset in the node of the second blockchain based on their membership in the first permissioned blockchain network and the second permissioned blockchain network, respectively.

16. The computer system of claim 15, the stored program instructions further including program instructions to provide a public digital asset catalog, wherein the public digital asset catalog allows users to request licenses for digital assets, including the digital asset, and verifies license requests using at least the first permissioned blockchain network.

17. The computer system of claim 16, the stored program instructions further including program instructions to utilize the watermarked version of the digital asset stored in the node of the second blockchain as a representation of the digital asset in the public digital asset catalog.

18. The computer system of claim 17, the stored program instructions further including program instructions to, in response to a user requesting a license of the digital asset via the public digital asset catalog:
verify a consensus for the request of the license of the digital asset using at least the first permissioned blockchain network; and
responsive to verifying the consensus for the request of the license of the digital asset, provide access to the digital asset to the user.

19. The computer system of claim 18, wherein providing access to the digital asset to the user includes providing a read-only link to the node on the first blockchain where the digital asset is stored.

20. The computer system of claim 18, wherein providing access to the digital asset to the user includes providing code for securely embedding the digital asset within a website.

* * * * *